United States Patent
Carpenter

(10) Patent No.: US 12,500,450 B2
(45) Date of Patent: Dec. 16, 2025

(54) WIRELESS LIGHTED PYRAMID SYSTEM

(71) Applicant: John C. Carpenter, Carmel, IN (US)

(72) Inventor: John C. Carpenter, Carmel, IN (US)

( * ) Notice: Subject to any disclaimer, the term of this patent is extended or adjusted under 35 U.S.C. 154(b) by 0 days.

(21) Appl. No.: 19/081,251

(22) Filed: Mar. 17, 2025

(65) Prior Publication Data

US 2025/0309687 A1   Oct. 2, 2025

Related U.S. Application Data

(60) Provisional application No. 63/571,799, filed on Mar. 29, 2024.

(51) Int. Cl.
| | |
|---|---|
| *H02J 50/10* | (2016.01) |
| *F21V 3/06* | (2018.01) |
| *F21V 23/02* | (2006.01) |
| *F21V 37/00* | (2006.01) |
| *F21Y 115/10* | (2016.01) |

(52) U.S. Cl.
CPC .............. *H02J 50/10* (2016.02); *F21V 3/062* (2018.02); *F21V 23/023* (2013.01); *F21V 37/0095* (2013.01); *F21Y 2115/10* (2016.08)

(58) Field of Classification Search
CPC .... F21V 3/062; F21V 23/023; F21V 37/0095; A61N 2/02
See application file for complete search history.

(56) References Cited

U.S. PATENT DOCUMENTS

| | | | | |
|---|---|---|---|---|
| D978,964 S | * | 2/2023 | Lu | D19/91 |
| D1,071,786 S | * | 4/2025 | Liu | D11/131 |
| 2006/0101567 A1 | * | 5/2006 | Hutchings | H02J 50/10 |
| | | | | 4/496 |
| 2023/0191220 A1 | * | 6/2023 | Czech | A63B 69/0026 |
| | | | | 473/570 |
| 2024/0140307 A1 | * | 5/2024 | Adams | H02J 50/10 |
| 2024/0297537 A1 | * | 9/2024 | Wang | H02J 50/10 |

OTHER PUBLICATIONS

Small Inductive Wireless LEDs—Adafruit—https://www.adafruit.com/product/5355—Mar. 6, 2025.

* cited by examiner

*Primary Examiner* — Christopher E Dunay
(74) *Attorney, Agent, or Firm* — George Pappas Barrett McNagny LLP

(57) ABSTRACT

A wireless lighted system includes a base with an electrically powered inductive coil and a translucent organic resin pyramid having encapsulated therein a plurality of wireless inductive LEDs within the organic resin that emit light when the pyramid is placed on or near the base.

16 Claims, 6 Drawing Sheets

WIRELESS LIGHTED PYRAMID SYSTEM

RELATED APPLICATION

This application claims the benefit of U.S. Provisional application No. 63/571,799 filed 29 Mar. 2024, the entire contents of which are incorporated herein by reference.

BACKGROUND OF THE INVENTION

Translucent plastic in the shape of a pyramid may be formed from organic material such as resin and inorganic material such as metal. When they cure together, the inherent compression creates a filter. The filter possesses ionic properties and thereby pulls in positive ions from the atmosphere and converts them to negative ions. Such pyramids are sometimes referred to as orgonite. Such pyramids may have embedded within crystals, wire coils, and aesthetically pleasing shapes. These are used to aid in self-help rituals such as meditation, chakra balancing, and kundalini. The energy conversion and emissions of the vibrations of the crystals and coils in combination with the orgonite layers are pleasing, balancing, and centering for persons that are sensitive.

Existing orgonite systems do not easily permit influencing the ionic conversion.

SUMMARY OF THE INVENTION

Disclosed is a translucent organic resin system, which may be a pyramid member, that includes a plurality of wireless inductive LEDs. The member has a lower surface shaped to fit on a base having an upper surface and an electrically powered inductive coil. When power is supplied to the inductive coil in the base, a magnetic field is created that induces a voltage in LEDs in the pyramid light, causing them to emit photons. The magnetic field may be at a sacred frequency and the photons emitted may be at a plurality of colors or wavelengths.

The combination creates a new version of resin or orgonite that is visually pleasing as well as having enhanced ionic conversion at sacred frequencies. The pyramid may be removed from the base unencumbered by the cord supplying power to the base and placed on various parts of a body, such as chakra points.

DETAILED DESCRIPTION

Figure 1:
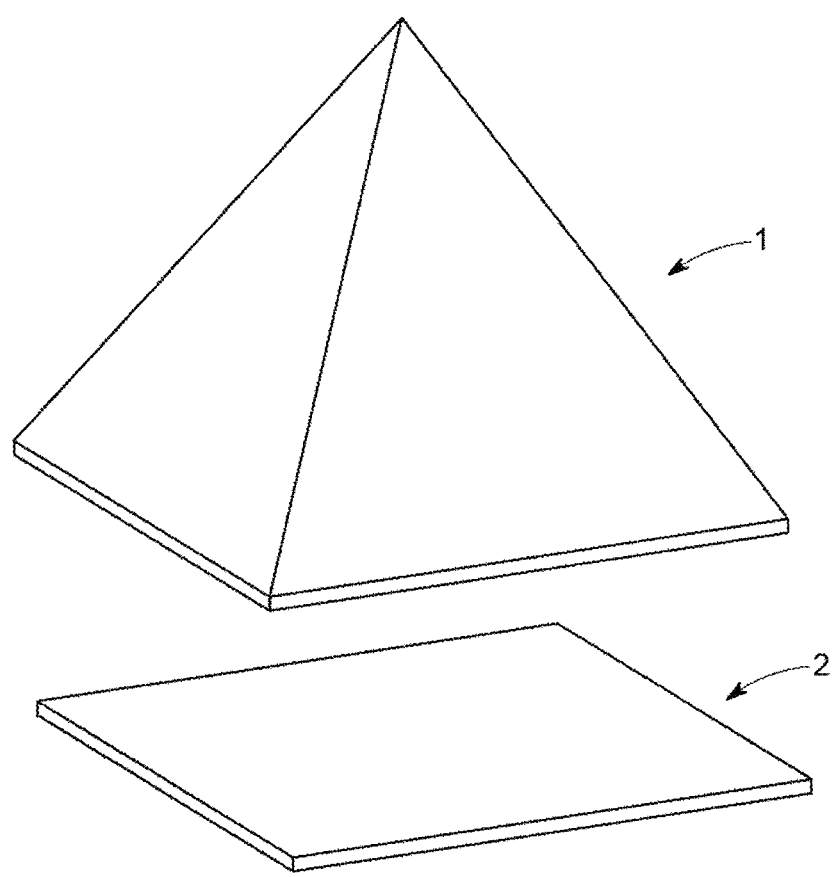
FIG. 1 is a diagrammatic view showing the removable pyramid and the inductive base on which it may be set.

As shown in FIG. 1, base 2 is placed beneath the pyramid-shaped resin member (orgonite) 2. Both the base and the resin pyramid may be formed from an organic resin, such as epoxy resin. The resin may be clear or tinted, but should be translucent. A pyramid is a polyhedron of which the bottom face is a polygon of any number of sides, and the other faces are triangles with a common vertex. However, the pyramid of the present invention could have other shapes, such as a 4-24 sided polyhedron, cone or cylinder.

Figures 2A, 2B:
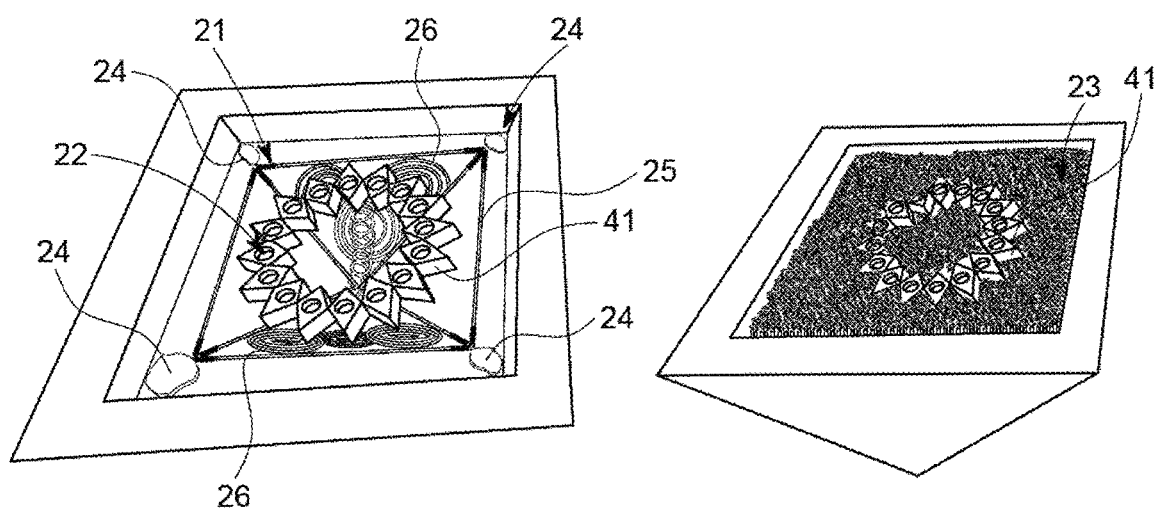
FIGS. 2A and 2B are views of an inverted mold that may be used create a pyramid shaped resin member.

FIG. 2A shows an inverted mold have a cavity in the shape of a pyramid. The pyramid may be made to include a wire cage including triskelions. Prior to filling the mold, with resin a pyramid cage may be formed from copper wire. The cage may have the same number of sides as the pyramid. The figures show a four-sided pyramid. The cage may be formed by copper wires 25, and adjacent ends of each edge may be joined by a coiled wire 28. For each side of the pyramid of the wire cage, a wire triskelion may be affixed to the edge of the cage by coils 27. In one embodiment for a four-sided pyramid, at least two opposing sides of the pyramid include triskelions.

To form the resin member, a wire cage 21 in the shape of a pyramid, optionally having triskelions 26, may be placed in the mold. One or more crystals 29, each optionally being surrounded by a coiled wire 40, may also be placed in the mold. Liquid resin is poured into the mold until it is about 80% full. Next, LED ring 41 is placed on the surface of the poured resin. Each aperture of LED ring 41 holds an LED. Optionally, a crystal may be placed on each corner of the wire cage 21. As shown in FIG. 2B metal shavings 23 of aluminum, steel or other metal may be placed on the surface of the resin around and within LED ring 41. Then, further liquid resin is poured into the mold to encapsulate the other components. The resin may take up to 3 days to cure. The result is a pyramid that is substantially resin on the exterior and has the interior components described above.

Base 2 may also be formed by placing in a mold a PCB 31 connectable to a power source such as a USB port, and coil ring 32. Optionally crystals may also be placed in the mold for base 2. Then resin is poured into the mold to encapsulate the above components.

Pyramid 1 provides a wide base surface area shaped to match base 2, LED ring 41, and LED's 22 which may be positioned in apertures of LED ring 41. The additional area above leaves room to house aesthetically pleasing components such as crystals, coils, triskelions, and other features that add beauty or influence the direction of ionic flow. In one embodiment the four-sided pyramid is 4 in.×4 in. at the base, and each side forms a vertex at an angle of approximately 51.6 degrees.

Figure 3:
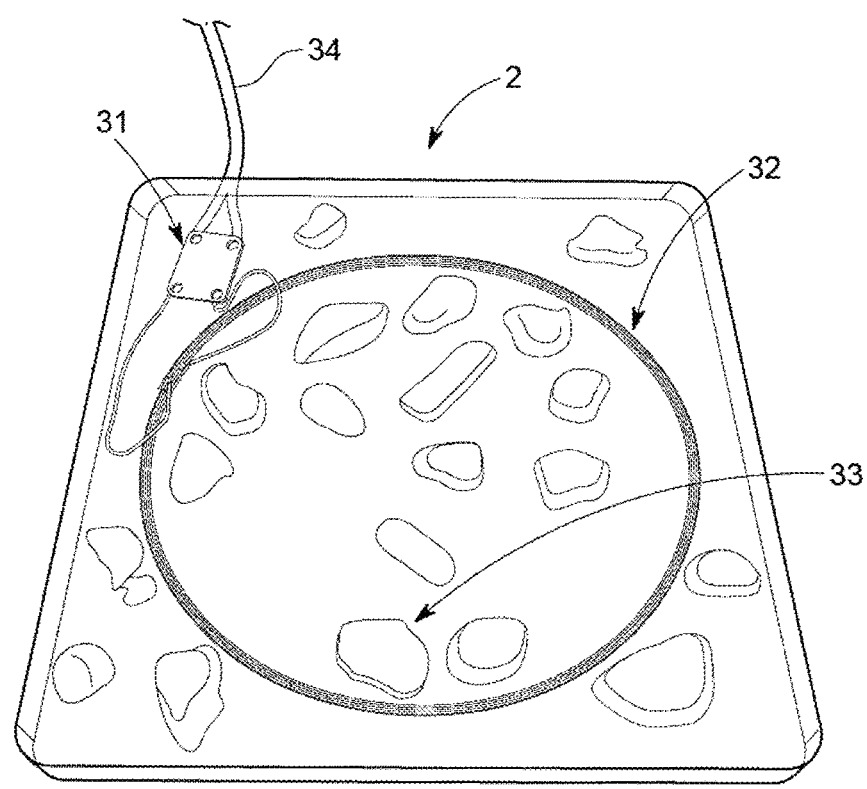
FIG. 3 is a view of the base of the system showing embedded crystals and an inductive coil.

As shown in FIG. 3, Inductive base 2 houses PCB 31 and the coil 32. It may have a 2-wire cable 34 that extends from the base to connect to 5VDC, such as a USB port. This could also be a USB A, C, or other header at the base. Small crystals such as 33 may be added to provide an aesthetically pleasing feature to the base. In one embodiment the base is 4 in.×4 in. with chamfered edges to provide a continuous surface when the pyramid is placed on it. It is also possible to place a triskelion or other coil in the center of the base inside transmit coil 32.

This configuration allows the removable pyramid 1 to quickly be taken and used without interfering with cable 34 for the PCBA 31 and coil 32.

As shown in FIG. 3, the base has embedded coil 32 connected to a printed circuit board (PCB) 31 that may be powered at 5VDC from a USB cable. PCB 31 and coil 32 create an inductive field with the coil at a given frequency. The frequency may be a sacred frequency such as 144 HZ, or one of the Solfeggio frequencies relevant to the Chakras of 396 Hz (Root), 417 Hz (Sacral), 528 Hz (Solar Plexus), 639 Hz (Heart), 741 Hz (Throat), 852 Hz (Third Eye), or 963 Hz (Crown). In one embodiment, the field can induce enough voltage to light the LEDs 22 at about a 70 mm range.

Figure 4:
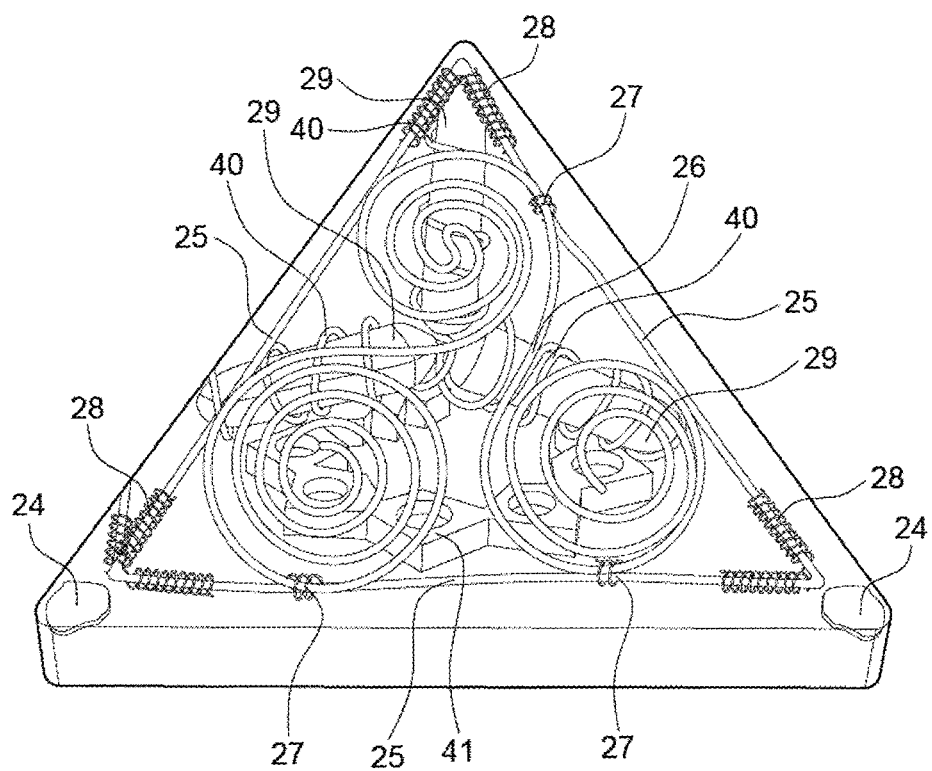
FIG. 4 is a side view of a translucent pyramid portion of the system showing components embedded within it.

As shown in FIG. 4, in the pyramid itself, ring 41 is used to position multiple LEDs 22 with the metal 23 in the resin layer of the pyramid. In one embodiment ring 41 may hold 16 LEDs, but a ring with a different number of apertures may be used. The LEDs may be placed in the ring so the light they project is either upward or downward, and they may form any shape, whether circular or otherwise. It is also within the scope of the invention to forgo with the ring entirely or to place LEDs in random locations within the pyramid.

This configuration influences several factors of what happens in the base. When pyramid 1 is placed on base 2, the ionic conversion of the pyramid is influenced by a magnetic field at, for example, 852 Hz. Ionic flow is very bulky at a molecular level comparable to a busy high school hallway at period change. The 852 Hz magnetic field causes the ions to be deflected into their free paths. This creates ionic emissions at the sacred frequency from the pyramid when near the orgonite base.

Additionally, a voltage is induced on coil 32 that creates an electron current flow at 852 Hz as well as colored photonic light emission from the LEDs 22 at 852 Hz from the same ionic orgonite base. The orgonite base introduces an 852 Hz magnetic field that when placed within the range of the orgonite layer deflects the ions, induces voltage and electron current flow, and produces photonic light. The combination of these advancements and influences on the orgonite makes it more emissive and regulated to sacred vibration. This makes it more likely for those that are sensitive to resonance from the orgonite.

The detachability of the orgonite pyramid from its base allows the pyramid to be placed on chakra's during meditation. In addition, moving orgonite pyramid 1 into and out of the magnetic field of base 2 allows visual verification of the field as LEDs 22 will fade in and out depending on proximity to base 1.

In an alternate embodiment, all components may be integrated into the base. The base could have metal and resin in the same layer as the PCB 31, coil 32, and LED ring 41 with LEDs 22. This would make a single self-integrated ionic conversion device that would not have the portability of a removable component.

As shown in FIG. 4, pyramid 1 may include the following components. LED ring 41 has multiple apertures, each of which may hold an LED 22, which may be either facing upward or downward. Ideally, LED 41 ring is horizontal and centered in the pyramid. Pyramid 1 may also have multiple crystals 29, each of which may be within a metal coil 40. In the embodiment shown in FIG. 4, there is one vertically oriented crystal 29 and two mostly horizontal crystals 29. The pyramid may also have a quartz crystal 24 in each bottom corner (also shown in FIG. 2). FIG. 4 shows one side of a four-sided pyramid. A pyramid cage is comprised of three metal wires 25, whose adjacent ends are connected to each other by coiled wires 28. The pyramid cage holds triskelion 26 within the cage. The three legs of triskelion are held to three metal wires 25 by small wire coils 27. In one embodiment, there are two triskelions on opposing faces of a pyramid having four faces. The triskelions may be in clockwise rotation when facing the pyramid. The influence of the 70 mm inductive magnetic field reaches to the top of the pyramid.

The pyramid of FIG. 4 may be made using a mold having an interior cavity in the shape of a pyramid. As shown in FIG. 2A, pyramid-shaped mold 21 may be inverted. Wire cages having triskelions 26 may be inserted into the mold, and an organic epoxy resin having inorganic aluminum chips 23 may be poured into the mold to fill it to about 85% of its height. Then LED ring 41 containing LEDs 22 may be placed on the surface of the resin, along with a quartz crystal 24 in each corner. Finally, further resin may be poured into the mold to encapsulate these components within. After the resin sets, the pyramid may be removed from the mold.

The disclosed embodiment is just one example of an aesthetically pleasing configuration. The coils 40 around the crystals 29 and the triskelions add beauty can help give direction to the induced ionic flow. If a triskelion is facing a person, the flow rotates in a clockwise direction to thereby move the energy is toward the person.

LED ring 41 is not necessary for the device, but its inclusion allows LEDs 22 to be positioned where desired within the pyramid during manufacturing and preferably adds symmetry and beauty. Different shapes may be used. LED ring 41 also provides electrical isolation if conductive inorganic material is used. In one embodiment, LED 41 ring has 16 apertures and each aperture can hold one inductive LED 22, i.e., a LED that can be powered by an inductive force, such as inductive wireless LEDs part no. 5355 from Adafruit Industries LLC (Digikey Part No. 1528-5355-ND). LEDs 22 may be positioned so they emit light at any desired angle.

The organic/inorganic mix generates excessive ions. Aluminum is used in this example, however, iron, copper, brass, bronze, gold, silver, or any other metallic inorganic material/crystals can be used. For improved performance, more surface area is better, so foils, chips, powders, machined cutoffs, and other high surface area forms of the material are suitable. It is possible to make an ionic conversion device that does not have any metal other than that described above for the cage. It will still have ionic conversion. In one embodiment, ionic conversion results from both the interfaces between the organic and inorganic constituents, and the inductive base.

Crystals near the inductive base may vibrate/oscillate making the ionic conversion at the defined frequency. However, these crystals are added so that if the pyramid is removed, then the vibrations of the crystals will continue to influence the ionic conversion. These are optional as ionic conversion may occur without them.

In one embodiment PCB 31 is powered by 5VDC. In this example, a 6' cable that has male USB type A on one end and a flying lead at the other. The flying lead end is soldered directly to the PCB and the resin may act as a strain relief. The power could also be connectorized with headers such as USB C, or A. The inductive coil may be 80 MM in diameter and have a range of 70 mm for LED response and the magnetic field. Differing numbers of turns and diameters could be used for differing shapes and sizes of the ionic conversion device as well as different frequencies of operation. The desired frequency may be achieved by the resonance frequency equation: $f=1/(2\pi\sqrt{(LC)})$, where "f" represents the resonance frequency in Hertz, "L" is the inductance measured in Henries, and "C" is the capacitance measured in Farads.

Crystals 33 and 29 add an aesthetic quality to the system. Representative crystals that may be used include citrine, amethyst, onyx and carnelian.

Figure 5:
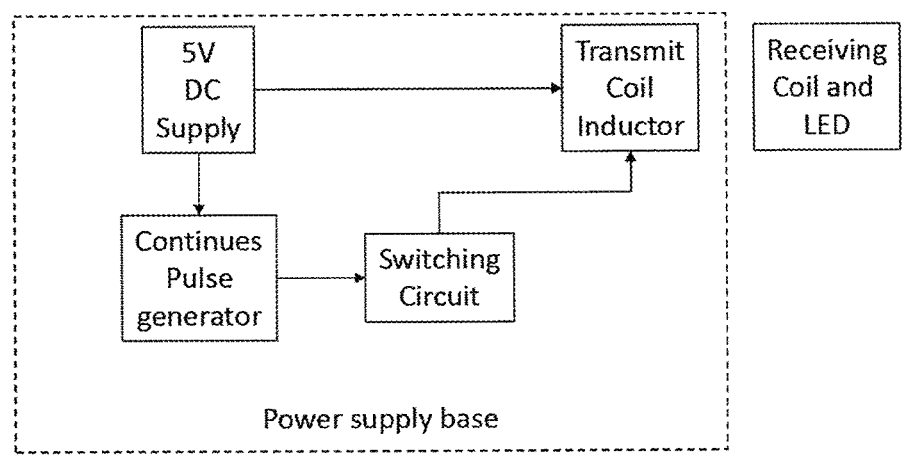
FIG. 5 is a block diagram showing components of the power supply base and the LED components of the resin member.

As shown in FIG. 5, a 5VDC supply voltage allows many options for power. In the USB configuration it allows portable battery packs or wall adapters common to many devices to be able to be used to power the ionic conversion device. The Continuous Pulse Generator may be provided by any of several circuit and chip types that can be used to generate a frequency in AC. This can include 555 timers in continuous mode, CMOS and TTL oscillators, and a plethora of integrated chips. All of these allow frequency to be fixed or even adjusted. For the switching circuit, depending on the current capability of the output of the continuous pulse generator, an additional FET or other current capable component may be needed to support the power needed for the transmit coil inductor. The transmit coil inductor may comprise the 80 mm coil shown in the base as discussed above. This induces the magnetic field at the given frequency deflecting the ions and also providing power to the LEDs receiving coil. The LEDs 22 embedded in the resin are essentially wireless between coils. The receiving coil picks up the inductive field when in range and induces enough voltage and current on the coil to operate the LEDs. The LED brightness will wax and wane depending upon proximity. This is why the LED ring is at the bottom layer of the pyramid example.

Figure 6:
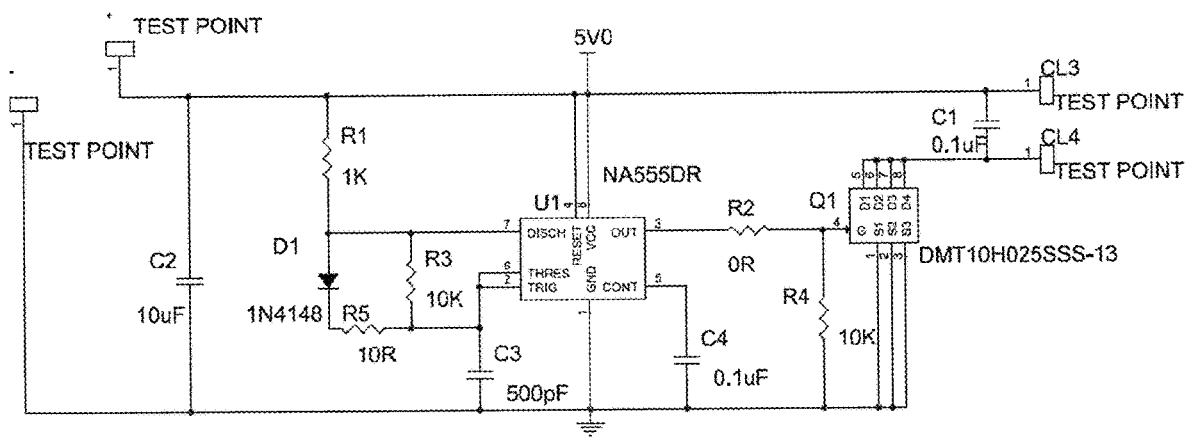
FIG. 6 is a circuit diagram showing electrical components within the base that may be used to power the coil.

As shown in FIG. 6, components of the PCB disclosed system may include a 555 timer for continuous pulse generation. This makes it very simple to assign a frequency. It may be desirable to assign a sacred frequency such as a solfeggio frequency. The discharge, threshold, and trigger pins on the 555 can be configured with capacitor C1 and resistor R36 (Potentiometer in this example) to define the frequency of oscillation. In one embodiment, R36 is used to fine tune in order to adjust for the tolerances that are in capacitors and resistors. The resistor and capacitor values may be adjusted to oscillate at 852 Hz solfeggio frequency in a fixed state. A microcontroller may be used to facilitate push button operation and multiplex or a simple selector switch. This could allow in the 555 example, the ability to create multiple tight tolerance resistor and capacitor arrays that could be selected or multiplexed to allowing selectable frequency. It would then be possible to select any of the 7 solfeggio frequencies representing each chakra in the ionic conversion device.

Switching circuit may comprise a DMT10H025SSS-13 MOSFET. This is the amplifier for the transmit coil inductor. For instance an integrated CKT-801 chip may integrate the function of the 555 timer and the MOSFET and still have frequency control.

The disclosed ionic conversion device may be impregnated in resin. As long as there is good ionic cleanliness of the components in the resin, such an embodiment will provide reliable circuitry and resistance to corrosion and electro-migration.

The LED's can be any color available in the market including UV and infrared. For instance, a system could have red carnelian crystals in the base, the circuit tuned to 396 Hz for root chakra, red LED's in the light ring, and main red carnelian crystal in the removable component. This would make an attractive combination for those that are working on their root chakra. With a selectable frequency inductive base, it is possible to tune the LED receiving coils to pick up (resonate) on different selectable frequencies and only the proper color LED for the frequency would illuminate when its solfeggio frequency is selected. This would provide an ionic conversion device that adjusts the color LED with the selectable sacred frequency. The crystals, coils, triskelions, cages, inorganic material, shape, and circuit frequencies can all be fixed or adjusted to create countless combinations of differing energies and aesthetically pleasing combinations.

The system is like a transformer with the secondary far from the primary coil. So there are two factors, frequency and voltage induction. Inductive coil 32 may have 40 turns of copper wire. If LEDs 22 have inductive coil pickup that also have 40 turns, there will be a 1 to 1 ratio in voltage transfer. By adding more turns of copper wire in 32, the voltage will be amplified, which will add range at the cost of more copper and a bigger footprint. For frequency, higher frequencies in the 20 to 80 KHz range are optimal for power transfer in the magnetic field. This helps the use of low power small electronics. In one embodiment, a third resonance or harmonic of 852 Hz is used, namely 2556 Hz.

While the invention has been illustrated and described in detail in the foregoing drawings and description, the same is to be considered as illustrative and not restrictive in character, it being understood that only illustrative embodiments thereof have been shown and described and that all changes and modifications that are within the scope of the following claims are desired to be protected.

All references cited in this specification are incorporated herein by reference to the extent that they supplement, explain, provide a background for or teach methodology or techniques employed herein.

The invention claimed is:
1. A wireless lighted system comprising:
 a. a base comprising
  i. an upper surface and
  ii. an electrically powered inductive coil that creates an electromagnetic field,
 b. a translucent organic resin member comprising:
  i. a lower surface shaped to fit on the upper surface of the base;
  ii. a plurality of inorganic metal particles within the organic resin member that resonate when in the electromagnetic field generated by the inductive coil,
  iii. a plurality of wireless inductive LEDs within the organic resin that emit light when in the electromagnetic field generated by the inductive coil.
2. The wireless lighted system of claim 1 wherein the organ resin member is a pyramid.
3. The wireless lighted system of claim 1 wherein the organic resin member further comprises crystals.
4. The wireless lighted system of claim 3 wherein the crystals deflect ions.
5. The wireless lighted system of claim 3 wherein the crystals comprise homogeneous solid substances having a natural geometrically regular form with symmetrically arranged plane faces.
6. The wireless lighted system of claim 3 wherein the crystals comprise citrine.
7. The wireless lighted system of claim 3 wherein the crystals comprise amethyst.
8. The wireless lighted system of claim 3 wherein the crystals comprise onyx.
9. The wireless lighted system of claim 3 wherein the crystals comprise carnelian.
10. The wireless lighted system of claim 1 wherein the inorganic metal particles comprise aluminum.
11. The wireless lighted system of claim 1 wherein the frequency of the electromagnetic field from the base is adjustable.
12. The wireless lighted system of claim 1 wherein the resin is plastic.
13. A lighted resin pyramid system comprising:
 an organic resin pyramid comprising a plurality of faces and having enclosed therein:

an electrically powered inductive coil that creates an electromagnetic field, a plurality of inorganic metal particles within the resin member that resonate when in the electromagnetic field generated by the inductive coil, a plurality of wireless inductive LEDs that emit light when in the electromagnetic field generated by the inductive coil a plurality of triskelions, a power input electrically connected to the inductive coil.

14. The lighted resin pyramid system of claim 13 wherein the plurality of wireless inductive LEDs are oriented in a circle.

15. The lighted resin pyramid system of claim 13 wherein the organic resin pyramid further comprises crystals embedded therein.

16. The lighted resin pyramid system of claim 13 wherein the organic resin pyramid further comprises metal particles embedded therein.

* * * * *